United States Patent
Nakamura et al.

(10) Patent No.: US 11,215,144 B2
(45) Date of Patent: Jan. 4, 2022

(54) SCRAMJET ENGINE

(71) Applicant: MITSUBISHI HEAVY INDUSTRIES, LTD., Tokyo (JP)

(72) Inventors: Masaharu Nakamura, Tokyo (JP); Shojiro Furuya, Tokyo (JP); Mariko Hirokane, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 183 days.

(21) Appl. No.: 16/468,996

(22) PCT Filed: Dec. 5, 2017

(86) PCT No.: PCT/JP2017/043639
§ 371 (c)(1),
(2) Date: Jun. 12, 2019

(87) PCT Pub. No.: WO2018/154908
PCT Pub. Date: Aug. 30, 2018

(65) Prior Publication Data
US 2019/0316546 A1    Oct. 17, 2019

(30) Foreign Application Priority Data

Feb. 24, 2017 (JP) .............................. JP2017-033351

(51) Int. Cl.
*F02K 7/14* (2006.01)
*F02C 9/28* (2006.01)

(52) U.S. Cl.
CPC ............... *F02K 7/14* (2013.01); *F02C 9/28* (2013.01); *F05D 2220/10* (2013.01); *F05D 2270/30* (2013.01)

(58) Field of Classification Search
CPC ........... F02K 7/14; F02K 7/10; F05D 2220/10
See application file for complete search history.

(56) References Cited

U.S. PATENT DOCUMENTS 2,952,123 A * 9/1960 Rich ..................... F02K 1/28
60/231
3,646,762 A * 3/1972 Hawk .................. F42B 10/668
60/204
(Continued)

FOREIGN PATENT DOCUMENTS

DE   10 2011 000 383    8/2012
JP       4-219452        8/1992
(Continued)

OTHER PUBLICATIONS

Hanson "Applications of quantitative laser sensors to kinetics, propulsion and practical energy systems"; Proceedings of the Combustion Institute 33 (2011); pp. 1-40 (Year: 2011).*
(Continued)

*Primary Examiner* — Ted Kim
(74) *Attorney, Agent, or Firm* — Wenderoth, Lind & Ponack, L.L.P.

(57) ABSTRACT

A scramjet engine has a first passage forming member and a second passage forming member. A passage is formed between a first surface and a second surface. The passage has an upstream zone, a combustion zone and a downstream zone. A cavity of a concave shape is provided on the first surface in the combustion zone. The first passage forming member has a convex section located in the upstream zone, a first fuel injection section configured to inject fuel into the passage from a first fuel nozzle provided for the convex section, and a second fuel injection section configured to inject fuel to the cavity. The second passage forming member has a third fuel injection section configured to inject fuel to a direction toward the first surface from the second surface in the passage through a second fuel nozzle provided in the downstream zone.

7 Claims, 4 Drawing Sheets

(56) References Cited

U.S. PATENT DOCUMENTS

| | | | | |
|---|---|---|---|---|
| 5,072,581 | A | * | 12/1991 | Harshman ............... F02K 7/10 |
| | | | | 60/768 |
| 5,085,048 | A | | 2/1992 | Kutschenreuter, Jr. et al. |
| 5,109,670 | A | * | 5/1992 | Harshman ............... F23R 3/00 |
| | | | | 60/204 |
| 5,253,474 | A | | 10/1993 | Correa et al. |
| 5,255,513 | A | | 10/1993 | Kutschenreuter, Jr. et al. |
| 6,112,513 | A | * | 9/2000 | Catt ........................ F02K 1/30 |
| | | | | 239/265.17 |
| 2008/0060361 | A1 | | 3/2008 | Morrison et al. |
| 2008/0196414 | A1 | * | 8/2008 | Andreadis ............ F01D 9/065 |
| | | | | 60/746 |
| 2015/0013305 | A1 | * | 1/2015 | Trefny ................... F23R 3/42 |
| | | | | 60/205 |

FOREIGN PATENT DOCUMENTS

| | | | | |
|---|---|---|---|---|
| JP | 5-180074 | | 7/1993 | |
| JP | 5-272411 | | 10/1993 | |
| JP | 2004-84516 | | 3/2004 | |
| JP | 2008-64086 | | 3/2008 | |
| JP | 2012-013007 | | 1/2012 | |
| JP | 2012-202226 | | 10/2012 | |
| JP | 2012-207555 | | 10/2012 | |
| JP | 2016-138725 | | 8/2016 | |
| JP | 2016-186409 | | 10/2016 | |
| KR | 20110072150 | * | 6/2011 | ............ F02K 7/14 |

OTHER PUBLICATIONS

Freeborn "Swept-Leading-Edge Pylon Effects on a Scramjet Pylon-Cavity Flameholder Flowfield" Journal of Propulsion and Power; vol. 25, No. 3, May-Jun. 2009, pp. 571-582. (Year: 2009).*

Li et al. "Plasma-assisted ignition for a kerosene fueled scramjet at Mach 1.8", Aerospace Science and Technology, vol. 28, Issue 1, 2013, pp. 72-78 (Year: 2013).*

Extended European Search Report dated Oct. 9, 2019 in European Patent Application No. 17897773.2.

Notification of Transmittal of Translation of the International Preliminary Report on Patentability dated Sep. 6, 2019 in corresponding International (PCT) Application No. PCT/JP2017/043639, with English translation.

International Search Report dated Feb. 20, 2018 in International (PCT) Application No. PCT/JP2017/043639.

* cited by examiner

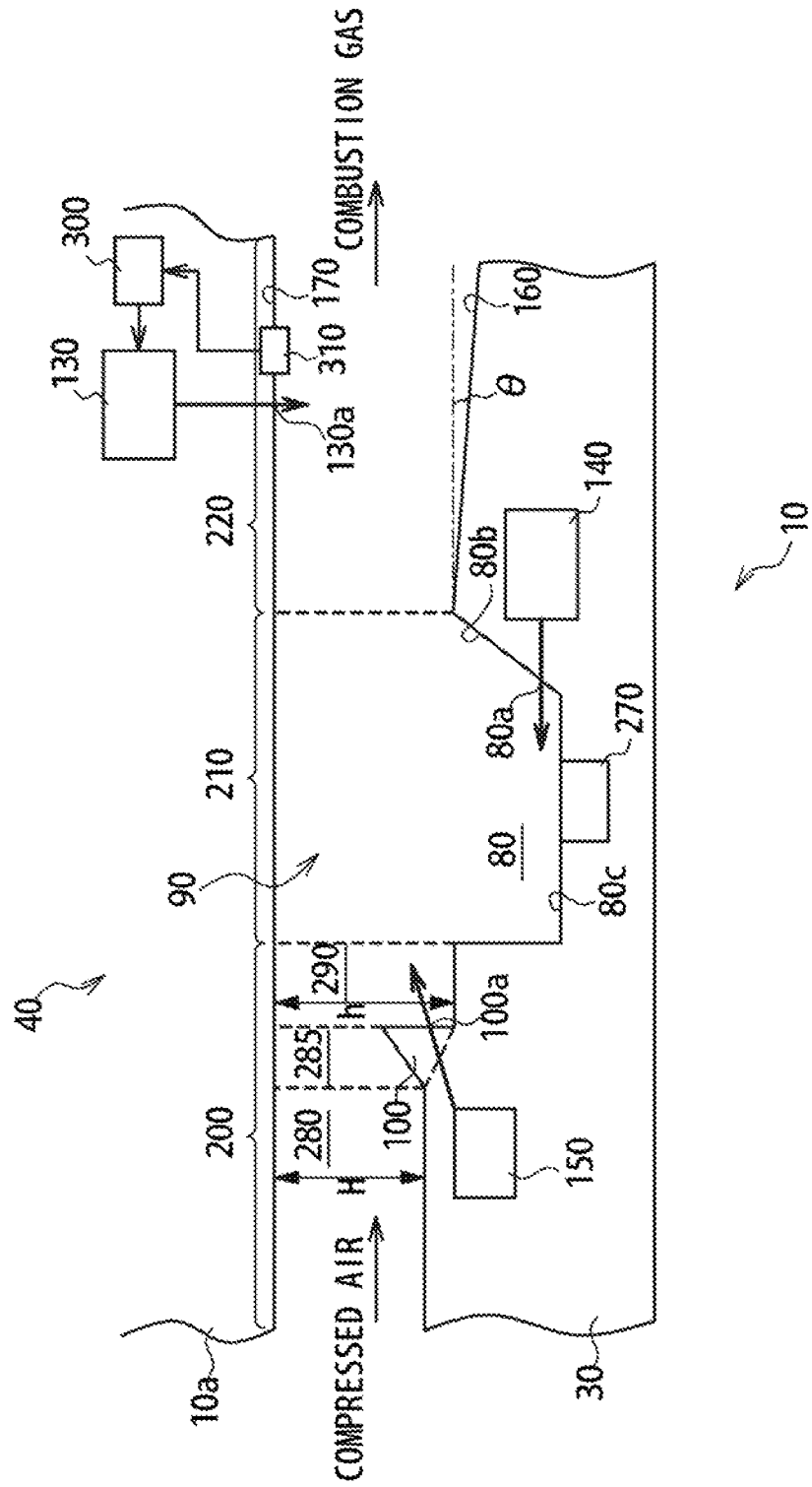

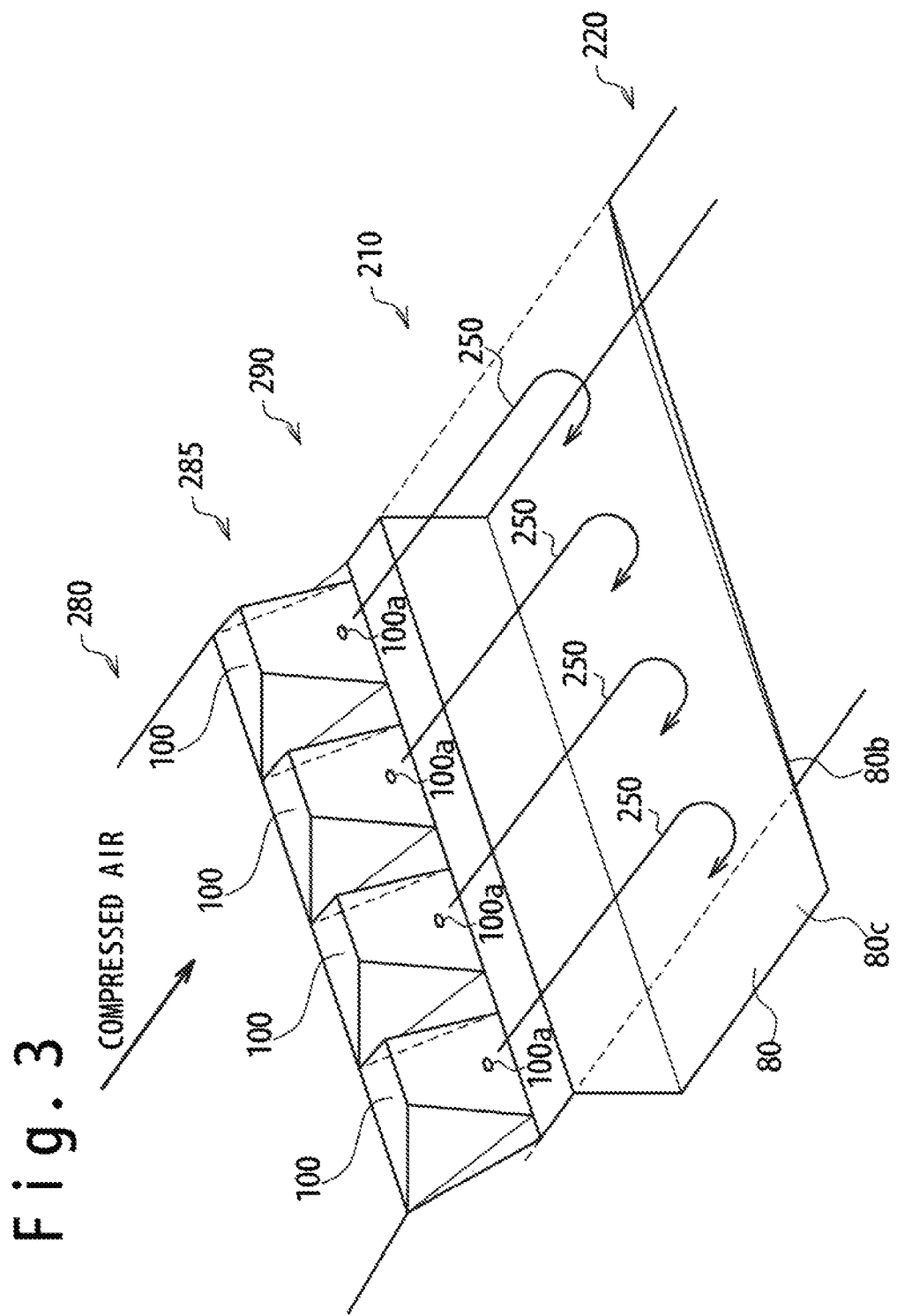

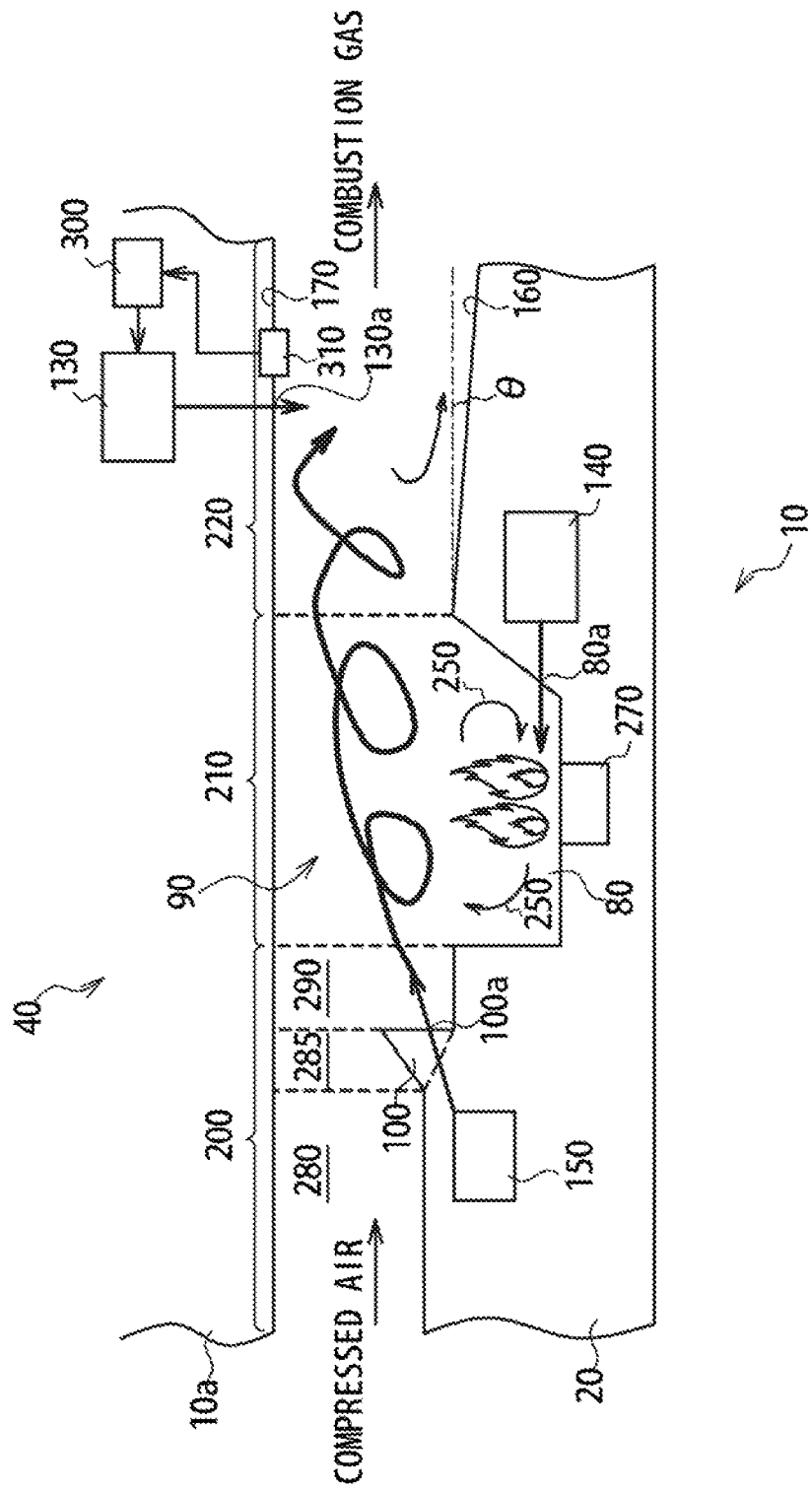

SCRAMJET ENGINE

CROSS-REFERENCE TO RELATED APPLICATION

The present invention is based on Japanese Patent Application Number JP 2017-033351 and claims priority therefrom. The disclosure of JP 2017-033351 is incorporated herein by reference.

TECHNICAL FIELD

The present invention relates to a scramjet engine.

BACKGROUND ART

A scramjet engine is sometimes used for a flight body flying in supersonic speed as a propulsion device in supersonic flight. The scramjet engine takes a supersonic air therein to compress with a Ram pressure, injects fuel into a supersonic flow of compressed air to generate a combustion gas and exhausts the combustion gas to acquire a propulsion force.

To acquire the enough propulsion force by the scramjet engine, it is necessary to combust the injected fuel surely to generate the combustion gas.

Patent Literature 1 (JP 2012-202226A) discloses a scramjet engine in which a fuel injection direction is variable. Patent Literature 1 discloses a technique of injecting the fuel into an air flow from a ramp provided for a wall, and a technique of injecting the fuel in the air flow in an upstream location from the cavity.

Also, Patent Literature 2 (JP 2004-84516A) discloses a technique of turning a re-circulation flow from a rear section to a rear direction by a prominent of an acute-angle provided for an engine wall and turning to the rear section.

CITATION LIST

Patent Literature

[Patent Literature 1] JP 2012-202226A
[Patent Literature 2] JP 2004-84516A

SUMMARY OF THE INVENTION

One of objects of the present invention is to provide a scramjet engine which can generate a combustion gas by burning injected fuel surely. The other objects and new features of the present invention could be understood by a skilled person from the following disclosure.

According to an aspect of the present invention, a scramjet engine of the present invention has a first passage forming member having a first surface, and a second passage forming member having a second surface opposite to the first surface. A passage is formed between the first surface and the second surface to connect a front opening and a rear opening provided downstream of the front opening. The passage has an upstream zone configured to receive a compressed air obtained by compressing an air taken in through the front opening; a combustion zone connected with a downstream side of the upstream zone and configured to generate a combustion gas by combusting a mixture obtained by injecting fuel into the compressed air; and a downstream zone connected with a downstream side of the combustion zone and configured to exhaust the combustion gas to the rear opening. A cavity is provided on the first surface to be located in the fuel supply region. The first passage forming member has at least one convex section located in the upstream zone and provided on the first surface to protrude toward the second surface from the first surface; a first fuel injection section configured to inject the fuel toward the passage through a first fuel nozzle provided for the convex section; and a second fuel injection section configured to inject the fuel toward the cavity. The second passage forming member has a third fuel injection section configured to inject the fuel to a direction toward the first surface from the second surface in the passage through the second fuel nozzle provided on the second surface in the downstream zone.

According to the present invention, the scramjet engine can be provided which can generate a combustion gas by burning the injected fuel surely.

BRIEF DESCRIPTION OF THE DRAWINGS

FIG. 2 is a cross sectional view of the scramjet engine according to the embodiments of the present invention.

FIG. 3 is a perspective view of an air passage of the scramjet engine according to the embodiments of the present invention.

FIG. 4 is a diagram showing a combustion state of the scramjet engine according to the embodiments of the present invention.

DESCRIPTION OF THE EMBODIMENTS

Figure 1:
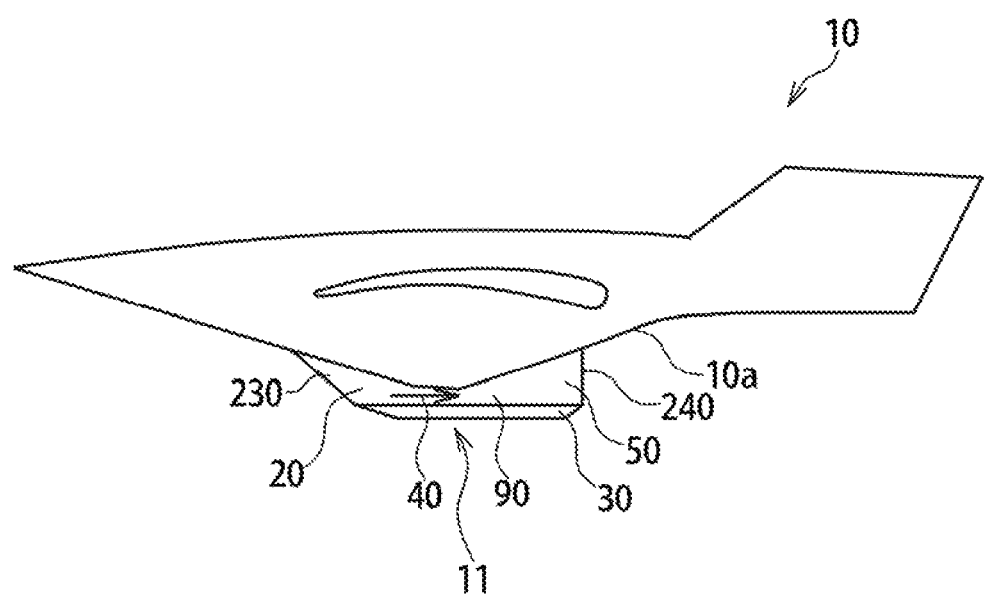
FIG. 1 is a diagram schematically showing a fuselage having a scramjet engine according to embodiments of the present invention.

Hereinafter, a scramjet engine according to an embodiment of the present invention will be described with reference to the drawings.

FIG. 1 is a schematic diagram showing a flight body for which the scramjet engine according to the embodiment of the present invention is provided. FIG. 2 is a cross sectional view of the scramjet engine according to the embodiment of the present invention. FIG. 3 is a perspective view showing an air passage of the scramjet engine according to the embodiment of the present invention. FIG. 4 is a diagram showing a combustion state of the scramjet engine according to the embodiment of the present invention.

As shown in FIG. 1, the flight body 10 in this embodiment is an aircraft or flying object for which the scramjet engine 11 is provided. The scramjet engine 11 has a cowl 30 installed to the fuselage 10a of flight body 10. The passage 90 is provided between the fuselage 10a and the cowl 30. That is, in the present embodiment, the fuselage 10a and the cowl 30 are used as passage forming members to form the passage 90. The passage 90 has an air compression section 20 configured to take in a supersonic flow of air from a front opening 230 and compress the taken-in air to form compressed air, a combustion section 40 configured to inject fuel into a flow 70 of compressed air, and combust fuel to form a combustion gas, and a nozzle section 50 configured to discharge the combustion gas from a rear opening 240.

FIG. 2 is a cross sectional view showing a configuration of the combustion section 40 of the scramjet engine 11. As shown in FIG. 2, the passage 90 is formed between a first surface 160 and a second surface 170 opposing to the first surface 160. Here, first surface 160 is a surface of the cowl 30 opposing to the fuselage 10a. The second surface 170 is a surface of the fuselage 10a opposing to the cowl 30. In the present embodiment, the second surface 170 is formed as a plane. As mentioned later, a first fuel injection section 150, a second fuel injection section 140, a cavity 80, an igniter 270 and so on are arranged in the cowl 30.

In the combustion section 40, the passage 90 has an upstream zone 200, a combustion zone 210 located downstream of the upstream zone 200 and a downstream zone 220 located downstream of the combustion zone 210 and connected with the nozzle section 50. The upstream zone 200 is configured from a first region 280, a convex section 100 provided on the first surface 160, and a second region 290, which are provided into a direction from the front opening 230 to the rear opening.

The upstream zone 200 is a zone to inject the fuel into the compressed air supplied from the air compression section 20 to generate a mixture of air and fuel, and to lead the generated mixture to the combustion zone 210. The upstream zone 200 is configured from the first region 280 located upstream, a convex section forming region 285 located downstream of the first region 280, and a second region 290 located downstream of the convex section forming region 285.

The first region 280 of the upstream zone 200 leads the compressed air supplied from the air compression section 20 to the convex section forming region 285.

The convex section forming region 285 is a region where the convex section 100 is formed. As shown in FIG. 3, the convex section 100 is provided on the first surface 160 of the cowl 30 to protrude to a direction toward the second surface 170 from the first surface 160. A plurality of the convex sections 100 are arranged in line in the direction orthogonal to the flow of compressed air in the first region 280.

At this time, as shown in FIG. 2, each of the convex sections 100 is formed to become higher toward the second region 290. In other words, the plane of the convex section 100 is inclined to become lower toward the first region 280. By such a structure, each convex section 100 disturbs the flow 70 of compressed air sent from the first region 280 to generate a turbulent flow downstream of the convex section 100, i.e. in the second region 290 and the combustion zone 210.

Each convex section 100 has a function to inject fuel (e.g. hydrogen jet fuel) into the turbulent flow. More specifically, a first fuel injection section 150 is provided for the cowl 30 and a fuel nozzle 100a is formed in each convex section 100. The fuel is supplied from the first fuel injection section 150 to the fuel nozzle 100a so as to be injected from the fuel nozzle 100a. The fuel is injected into the turbulent flow generated downstream of each convex section 100, i.e. the second region 290. Thus, the mixture in which the compressed air and the fuel have been mixed is generated efficiently in the second region 290.

Here, note that a space is formed between the adjacent convex sections 100. Also, a height h of the passage 90 in a direction orthogonal to the second surface 170 in the second region 290 is higher than a height H of the passage 90 in the direction orthogonal to the second surface 170 in the first region 280. Therefore, the pressure in the second region 290 becomes lower than the pressure in the first region 280, and a part of the compressed air flows into the second region 290 through the space between the adjacent convex sections 100. This flow of compressed air promotes the generation of turbulent flow downstream of the convex section 100, and contributes to the improvement of generation efficiency of mixture.

The shape of such a convex section 100 makes it possible to efficiently generate the mixture in which the compressed air and the fuel injected from the fuel nozzle 100a are mixed in the second region 290 of the upstream zone 200. The mixture having generated in the second region 290 flows into the combustion zone 210 located downstream of the second region 290.

The combustion zone 210 is a zone where the mixture is ignited and combusted. A cavity 80 is arranged in the combustion zone 210 for flame stabilization. As shown in FIG. 3, the cavity 80 is formed by denting the first surface 160 in the combustion zone 210, and a surface of the cavity 80 connected with the downstream zone 220 is inclined. A fuel nozzle 80a is formed in the inclined surface (hereinafter, to be also referred to as "a slope 80b"). The second fuel injection section 140 is provided for the cowl 30, and the fuel is injected into the cavity 80 through the fuel nozzle 80a.

The flow speed of mixture becomes slow in the cavity 80, and as shown in FIG. 3, a circulation flow 250 is generated along the slope 80b and base 80c of the cavity 80. The circulation flow 250 heads upstream in the position along the slope 80b or base 80c of the cavity 80, and the fuel is injected into the circulation flow 250 inside the cavity 80.

Here, the ignitor 270 is provided for the cavity 80, and as shown in FIG. 4, the ignitor 270 ignites the circulation flow 250 into which the fuel has been injected so that flame is held in the cavity 80. The flame held in the cavity 80 spreads to the mixture generated downstream of the convex section 100 so that the mixture combusts to generate the combustion gas.

The downstream zone 220 is connected with the combustion zone 210 on the downstream side. A third fuel injection section 130 is provided for the fuselage 10a in the downstream zone 220 to inject the fuel into the passage 90 through the fuel nozzle 130a provided for the second surface 170. Also, a mixture gas measurement section 310 which measures the state of combustion gas in the downstream zone 220 and determines whether or not it contains the fuel, and a fuel injection quantity control section 300 which controls a fuel injection quantity from the third fuel injection section 130 in response to the measured state of combustion gas are provided for the fuselage 10a. In the present embodiment, the mixture gas measurement section 310 is situated downstream of the fuel nozzle 130a.

The third fuel injection section 130 is provided to restrain or stop the flow of combustion gas by injecting the fuel. When the flow speed of combustion gas from the combustion zone 210 is excessively fast, the combustion gas does not combust fully even if the combustion gas is ignited by the flame held by the cavity 80. The flow of combustion gas is restrained or stopped by injecting the fuel through the third fuel injection section 130 provided for the fuselage 10a so that the speed of the flow of combustion gas is made slow. Thus, the combustion of combustion gas is promoted. Here, note that in the downstream zone 220, the fuel is injected from the surface (the second surface 170) opposing to the surface (the first surface 160) for which cavity 80 is provided. Especially, it is effective to restrain or stop the flow of combustion gas containing a lot of unburned fuel that the fuel is injected from the second surface 170 opposing to the first surface 160 for which cavity 80 is provided.

It is desirable that the fuel injection quantity of the third fuel injection section 130 is controlled by the fuel injection quantity control section 300 based on the state of combustion gas measured by the mixture gas measurement section 310. When determining that the combustion gas is in a perfect combustion state in the position of the mixture gas measurement section 310, based on the measurement result by the mixture gas measurement section 310 (that is, when determining that the combustion gas does not contain unburned fuel), the third fuel injection section 130 may stop the injection of fuel from the third fuel injection section 130 by the control of the fuel injection quantity control section 300.

The direction of fuel injection from the third fuel injection section 130 may be inclined on the upstream side from a direction orthogonal to the second surface 170. In this case, the constraint effect of the flow of combustion gas by the fuel injection can be enhanced.

The cross section of the passage 90 may become large toward the downstream side in at least a part of the downstream zone 220. Such a structure contributes to a smooth flow of combustion gas in the downstream direction along the first surface 160 of the downstream zone 220. In the scramjet engine 11 of the present embodiment, the flow of combustion gas is constrained or stopped with the fuel injection from the third fuel injection section 130. However, when the flow of combustion gas is excessively constrained or stopped, the pressure on the upstream side becomes high so that it becomes difficult to take in the air. By increasing the cross section of the passage 90 in the downstream direction in the downstream zone 220, a space to flow the substantively perfect combustion gas downstream along the first surface 160 can be secured, and the combustion gas can be smoothly exhausted for the rear opening 240.

Specifically, in the present embodiment, as shown in FIG. 2, an open angle is provided for the first surface 160 in the downstream zone 220. That is, the first surface 160 is inclined so as to open toward the side of the rear opening 240 (so that a distance between the first surface 160 and the second surface 170 becomes large toward the downstream side) in the downstream zone 220. In FIG. 2, an angle between the first surface 160 and the second surface 170 is shown as θ. Thus, the passage 90 has begun to open at the connection section of the combustion zone 210 and the downstream zone 220.

It is desirable that the first surface 160 in the downstream zone 220 is inclined by an angle from 2° to 4° to the second surface 170 in the downstream zone 220 so that the distance between the second surface 170 and the first surface 160 becomes large in the downstream direction. Also, the passage 90 does not have to begin to open always at the connection position of the combustion zone 210 and the downstream zone 220. The inclination of first surface 160 may begin from the way of the downstream zone 220.

The scramjet engine 11 of the present embodiment configured as mentioned above operates as follows. When the flight body 10 flies in a supersonic speed, air in the supersonic speed is taken into the passage 90 through the front opening 230. The taken-in air is compressed in the air compression section 20 to generate the flow of compressed air. The generated flow of compressed air is supplied to the combustion section 40.

FIG. 4 shows an operation of the combustion section 40 of the scramjet engine 11. The flow of compressed air having flowed into the first region 280 in the upstream zone 200 is disturbed by the convex section 100 in the convex section forming region 285, so as to generate the turbulent flow in the second region 290. Moreover, the fuel is injected from the fuel nozzle 100a provided for the convex section 100, and is mixed with the compressed air in the second region 290 so as to generate the mixture. By generating the turbulent flow due to the convex section 100, the compressed air and the fuel are efficiently mixed in the second region 290. The generated mixture is led to the combustion zone 210.

A part of the mixture generated in the second region 290 is decelerated by the cavity 80. Thus, the circulation flow 250 is formed in the cavity 80. The fuel is injected into the circulation flow 250 from the fuel nozzle 80a, and that the circulation flow 250 is ignited by the igniter 270. Thus, the flame is held by the cavity 80.

The mixture introduced into the combustion zone 210 is ignited with the flame held by the cavity 80 and combusts to generate the combustion gas. However, the combustion gas is not always perfectly combusted in combustion zone 210. The combustion gas flowing into the downstream zone 220 from the combustion zone 210 can contain unburned fuel.

The flow of combustion gas from the combustion zone 210 is constrained or stopped due to the fuel injection by the third fuel injection section 130 in the downstream zone 220, and the flow speed of combustion gas declines. Thus, the combustion of unburned fuel contained in the combustion gas can be promoted.

In this way, in the scramjet engine 11 of the present embodiment, the degree of combustion of combustion gas can be improved.

As described above, if the flow of combustion gas is excessively constrained or stopped with the fuel injection from the third fuel injection section 130, the pressure on the upstream side becomes high so that the air cannot be taken into from the front opening 230. Therefore, in the desirable embodiment, the space through which the flow of combustion gas is secured along the first surface 160 to become wider in a downstream direction by inclining the first surface 160 to the second surface 170 to be opened more on the downstream side in the downstream zone 220. The combustion gas can be smoothly exhausted to the downstream direction by such a structure (i.e. toward the rear opening 240).

The combustion gas is introduced into the nozzle section 50 from the downstream zone 220. The combustion gas expands in the nozzle section 50, accelerates and is spouted out through the rear opening 240. Thus, the propulsive force is obtained to thrust the flight body 10.

The present invention is not limited to the above embodiments and can be implemented in various modification forms. In short, the present invention is not limited to each of the above embodiments just as it is, and the component can be embodied by modifying it in a range not deviating from the gist in a practice use.

For example, in the above-mentioned embodiments, the description has been given, supposing that the first surface 160 is provided for the cowl 30 and the second surface 170 is provided for the fuselage 10a. However, the second surface 170 may be provided for the cowl 30 and the first surface 160 may be provided for the fuselage 10a. In this case, the components provided for the cowl 30 in the above-mentioned embodiments are provided for the fuselage 10a, and the components provided for the fuselage 10a are provided for the cowl 30.

Also, various forms can be realized through proper combination of components disclosed in the above embodiments. For example, some components may be omitted from all the components shown in the embodiments. Moreover, the components in the different embodiments may be combined appropriately.

The invention claimed is:

1. A scramjet engine comprising:
   a first passage forming member having a first surface;
   a second passage forming member having a second surface opposing the first surface;
   a mixture gas measurement section; and a fuel injection control section, wherein a passage is formed between the first surface and the second surface to connect a front opening and a rear opening downstream of the front opening, wherein the passage comprises:

an upstream zone configured to generate a flow of compressed air obtained by compressing an air taken in through the front opening;

a combustion zone connected downstream of the upstream zone and configured to combust a mixture in which fuel is injected into the flow of compressed air, to generate a combustion gas; and a downstream zone connected downstream of the combustion zone and configured to exhaust the combustion gas toward the rear opening, wherein a cavity is provided on the first surface in the combustion zone, wherein the first passage forming member comprises:

at least one convex section located in the upstream zone and provided on the first surface to protrude toward the second surface from the first surface;

a first fuel injection section configured to inject the fuel into the flow of compressed air through a first fuel nozzle provided for the at least one convex section; and a second fuel injection section configured to inject the fuel into the cavity, wherein the second passage forming member comprises a third fuel injection section configured to inject the fuel to a direction toward the first surface from the second surface in the passage through a second fuel nozzle provided on the second surface in the downstream zone, wherein the mixture gas measurement section is configured to measure a state of the combustion gas in the downstream zone, wherein the fuel injection control section is configured to control a fuel injection quantity from the third fuel injection section based on the state of the combustion gas measured by the mixture gas measurement section, and wherein the fuel injection control section is configured to control the third fuel injection section to stop injecting the fuel when the mixture gas measurement section measures that the combustion gas does not contain unburned fuel.

2. The scramjet engine according to claim 1, wherein the upstream zone has a first region located upstream of the at least one convex section and a second region located downstream of the at least one convex section, and wherein a height of the passage in a direction orthogonal to the second surface in the second region is higher than a height of the passage in a direction orthogonal to the second surface in the first region.

3. The scramjet engine according to claim 2, wherein the at least one convex section includes plural convex sections arranged in a direction orthogonal to the flow of compressed air in the first region.

4. The scramjet engine according to claim 1, wherein a surface of the cavity adjacent to the downstream zone is inclined with respect to the second surface.

5. The scramjet engine according to claim 1, wherein a cross-sectional area of the passage at a second position downstream of a first position in the downstream zone is greater than that of the passage at the first position in the downstream zone.

6. The scramjet engine according to claim 1, wherein the first surface is inclined in an angle range of 2° to 4° to the second surface in the downstream zone such that a distance from the second surface to the first surface becomes larger in a downstream direction.

7. The scramjet engine according to claim 1, wherein an injection direction of the fuel from the third fuel injection section is inclined to an upstream side from a direction orthogonal to the second surface.

* * * * *